United States Patent [19]
Olson

[11] Patent Number: 5,849,138
[45] Date of Patent: Dec. 15, 1998

[54] LABELING SYSTEM

[75] Inventor: Donald W. Olson, Mora, Minn.

[73] Assignee: Product Engineering, Inc., St. Paul, Minn.

[21] Appl. No.: 740,154

[22] Filed: Oct. 28, 1996

[51] Int. Cl.⁶ .................................................. B65C 9/00
[52] U.S. Cl. .......................... 156/522; 156/516; 156/552; 156/555; 156/566
[58] Field of Search .................................. 156/510, 516, 156/522, 552, 555, 556, 566

[56] References Cited

U.S. PATENT DOCUMENTS

| | | | |
|---|---|---|---|
| Re. 34,366 | 9/1993 | Instance | 40/299 |
| 3,625,547 | 12/1971 | Burke | 282/23 |
| 3,869,328 | 3/1975 | Instance | 156/285 |
| 4,007,824 | 2/1977 | Reist | 198/462 |
| 4,323,608 | 4/1982 | Denny et al. | 428/43 |
| 4,425,181 | 1/1984 | Bahr et al. | 156/497 |
| 4,479,838 | 10/1984 | Dunsirn et al. | 156/247 |
| 4,488,922 | 12/1984 | Instance | 156/192 |
| 4,504,348 | 3/1985 | Instance | 156/251 |
| 4,560,432 | 12/1985 | Instance | 156/459 |
| 4,583,765 | 4/1986 | Messinger | 282/9 R |
| 4,592,572 | 6/1986 | Instance | 281/2 |
| 4,637,633 | 1/1987 | Instance | 283/81 |
| 4,675,062 | 6/1987 | Instance | 156/227 |
| 4,680,080 | 7/1987 | Instance | 156/357 |
| 4,699,833 | 10/1987 | Instance | 428/42 |
| 4,708,368 | 11/1987 | Instance | 283/81 |
| 4,711,686 | 12/1987 | Instance | 156/227 |
| 4,726,972 | 2/1988 | Instance | 428/40 |
| 4,744,161 | 5/1988 | Instance | 40/2 R |
| 4,744,591 | 5/1988 | Instance | 281/5 |
| 4,747,618 | 5/1988 | Instance | 281/5 |
| 4,773,584 | 9/1988 | Instance | 229/74 |
| 4,781,773 | 11/1988 | Instance | 156/69 |
| 4,790,563 | 12/1988 | Instance | 283/81 |
| 4,799,712 | 1/1989 | Biava et al. | 282/1 A |
| 4,801,929 | 1/1989 | Instnace | 340/692 |
| 4,830,406 | 5/1989 | Instance | 283/81 |
| 4,849,043 | 7/1989 | Instance | 156/227 |
| 4,850,612 | 7/1989 | Instance | 281/5 |
| 4,850,613 | 7/1989 | Instance | 281/5 |
| 4,888,078 | 12/1989 | Instance | 156/249 |
| 4,894,106 | 1/1990 | Instance | 156/227 |
| 4,933,043 | 6/1990 | Instance | 156/248 |
| 4,976,351 | 12/1990 | Mangini et al. | 206/232 |
| 5,021,273 | 6/1991 | Kobayashi | 428/40 |
| 5,031,938 | 7/1991 | Instance | 283/81 |
| 5,048,870 | 9/1991 | Mangini et al. | 283/81 |
| 5,085,312 | 2/1992 | Ribordy et al. | 198/463.4 |
| 5,149,587 | 9/1992 | Hill et al. | 428/354 |
| 5,174,605 | 12/1992 | Instance | 281/5 |
| 5,207,458 | 5/1993 | Treichel et al. | 283/81 |
| 5,222,766 | 6/1993 | Instance | 283/81 |
| 5,234,735 | 8/1993 | Baker et al. | 428/40 |
| 5,261,502 | 11/1993 | Duke | 198/375 |
| 5,262,214 | 11/1993 | Instance | 428/40 |
| 5,264,265 | 11/1993 | Kaufmann | 428/40 |
| 5,284,363 | 2/1994 | Gartner et al. | 283/81 |
| 5,324,559 | 6/1994 | Brombacher | 428/40 |
| 5,328,208 | 7/1994 | Garrison | 283/105 |
| 5,389,415 | 2/1995 | Kaufmann | 428/40 |
| 5,399,403 | 3/1995 | Instance | 428/40 |
| 5,439,721 | 8/1995 | Pedroli et la. | 428/40 |
| 5,449,538 | 9/1995 | Denny | 428/40 |
| 5,470,418 | 11/1995 | Instance | 156/231 |
| 5,489,456 | 2/1996 | Instance | 428/40 |

*Primary Examiner*—James Sells
*Attorney, Agent, or Firm*—Hugh D. Jaeger

[57] ABSTRACT

Apparatus and process for application of pamphlets to a backing web having preprinted labels including a pamphlet applicator featuring cylindrical drive cams which propel pamphlet grasping assemblies at different speed rates to achieve optimum spacing during pamphlet application to a laminate web.

10 Claims, 15 Drawing Sheets

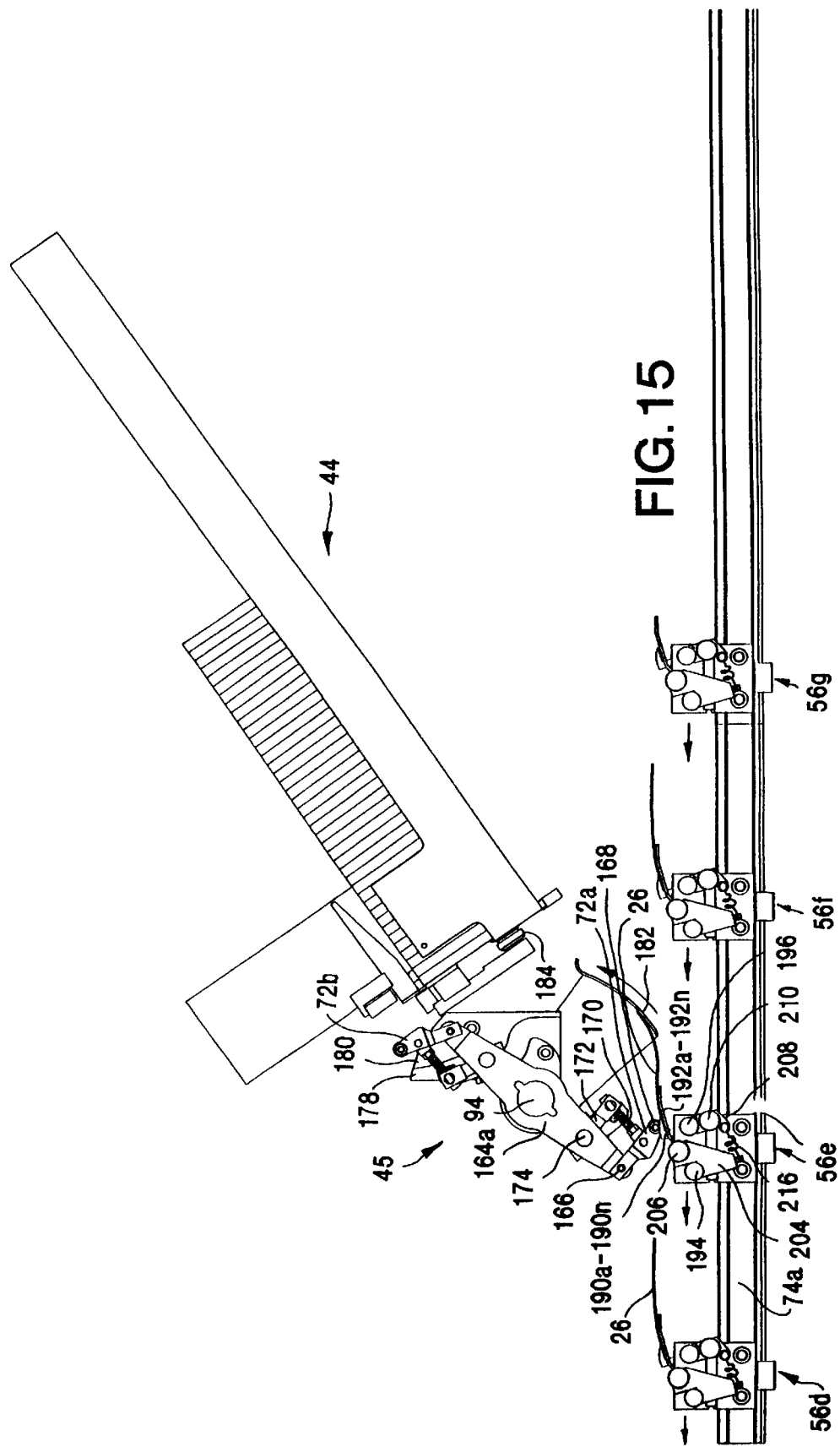

LABELING SYSTEM

BACKGROUND OF THE INVENTION

1. Field of the Invention

The present invention pertains to labeling and, more particularly, relates to a labeling system including a process and apparatus for application of a pamphlet or other printed literature to a laminate web with subsequent application to a backing web having preprinted labels. The present invention provides an apparatus and process for timely and properly spaced and sequenced application of pamphlets to a laminate web and to a preprinted backing web having preprinted labels.

SUMMARY OF THE INVENTION

The present invention relates to a process and apparatus to apply, in a timely and properly spaced manner, pamphlets to a laminate web, and subsequent application of the laminate web/pamphlets combination to a backing web having preprinted labels, where excess laminate web is subsequently stripped away to produce laminate covered pamphlets adhering to the preprinted labels on a web.

According to one embodiment of the present invention, there is provided an apparatus and process for application of pamphlets, which receive a laminate coating, to a backing web having preprinted labels. Magazines feed pamphlets, or other printed material, to pick and place assemblies, and subsequently to pamphlet grasping assemblies which travel around and about a parallel track system at varying speeds and spacings to deliver and apply pamphlets to an adhesive covered laminate web having an upwardly exposed adhesive face. These varying speeds and spacings are influenced by sets of cylindrical drive cams. The cylindrical drive cams of an upper set have spiral cam grooves having a pitch which causes the pamphlet grasping assemblies to travel at varying speeds allowing time for pamphlet transfer. The cylindrical drive cams of the lower set have spiral cam grooves having a varying pitch beginning with a decreasingly steep pitch which causes the pamphlet grasping assemblies to travel at a nominal rate of speed with wide spacing, and ending with an increasingly shallow pitch which causes the pamphlet grasping assembly to travel at a decreasing rate of speed with closer spacing for optimally spaced placement of pamphlets on the adhesive laden laminate web. Longitudinal movement of the pamphlet grasping assemblies is under control of the cylindrical drive cams, while arcuate movement of the pamphlet grasping assemblies is under control of cam operated engagement assemblies which engage the pamphlet grasping assemblies in the areas near the ends of the cylindrical drive cams. A backing web having preprinted labels and an applied ultraviolet cured release coating strip is merged with the laminate web and previously applied pamphlets, and the merged layers are fed through a die cutter to cut around and about the pamphlets but yet leave the backing web in an unaltered or perforated state. Subsequently, excess laminate web is stripped from the merged layers to leave a laminate web covering on the upper surface of each pamphlet.

Another embodiment discloses a high speed pick and place assembly featuring frictional wiper arms having frictional wiper members which engage a pamphlet between a reciprocating curved backing plate which, together, deliver a pamphlet to awaiting pamphlet grasping assemblies having upper and lower cam actuated finger-like grasping members.

One significant aspect and feature of the present invention is an apparatus for application of a pamphlet to a laminate web.

Another significant aspect and feature of the present invention is a process for application of a pamphlet to a laminate web and subsequent application to a backing web having preprinted labels.

Another significant aspect and feature of the present invention is the upwardly facing presentation of an adhesive surface on a laminate web.

Another significant aspect and feature of the present invention is a high speed transport arrangement which transfers a pamphlet to a cam operated grasping assembly.

Another significant aspect and feature of the present invention is the incorporation of cam operated grasping assemblies.

Another significant aspect and feature of the present invention is the incorporation of friction arms which frictionally engage and urge a pamphlet along and about a reciprocating curved backing plate.

Another significant aspect and feature of the present invention is the use of cam operated upper and lower finger-like pamphlet grasping members.

Another significant aspect and feature of the present invention is the use of upper and lower cylindrical drive cam sets being differently pitched to properly space pamphlet grasping assemblies along upper and lower horizontal paths.

Another significant aspect and feature of the present invention is the use of cam operated engagement assemblies which engage pamphlet grasping assemblies and propel the pamphlet grasping assemblies about arcuate slot paths at the turns of a racetrack-like slot.

Another significant aspect and feature of the present invention is the use of cam operated engagement assemblies which disengage pamphlet grasping assemblies and allow for propulsion of the pamphlet grasping assemblies along straight slot paths at the mid areas of a racetrack-like slot by cylindrical drive cam sets.

Having thus described significant aspects and features of the present invention, it is the principal object of the present invention to provide an apparatus and process for application of pamphlets to a preprinted backing web.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIGS. 10–15 illustrate, in sequential steps, the feeding of a pamphlet from a pick and place assembly to a pamphlet grasping assembly.

DETAILED DESCRIPTION OF THE PREFERRED EMBODIMENTS

Figure 1:
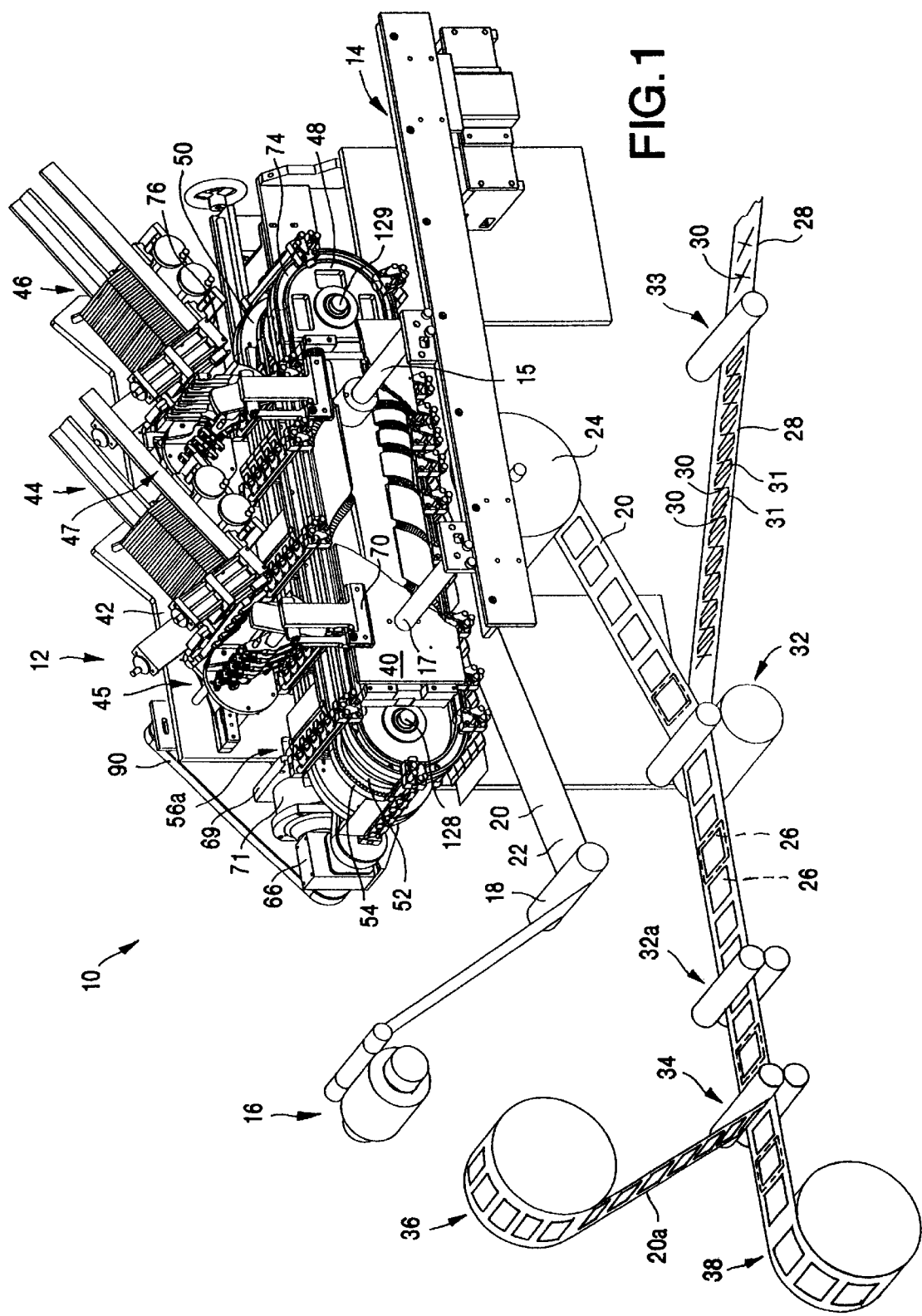
FIG. 1 illustrates a labeling system 10 including an apparatus and a process for application of pamphlets to a backing web having preprinted labels.

FIG. 1 illustrates a labeling system 10 including an apparatus and a process for application of pamphlets to a backing web having preprinted labels. The labeling system 10 includes a pamphlet applicator 12, in addition to other members described herein, which secures to a positionable and adjustable framework 14. A laminate web supply roll 16 and a roller 18 supply laminate web 20 having an adhesive facing 22 oriented on the upper surface thereof. The laminate web 20 aligns horizontally beneath the pamphlet applicator 12 to traverse about a roller 24, at which point a pamphlet 26, supplied by the pamphlet applicator 12, is applied to the adhesive facing 22 of the laminate web 20. Backing web 28, having a plurality of printed labels 30, and a plurality of applied ultraviolet cured release coating strip 31, is applied to the already attached pamphlets 26 and to the adhesive facing 22 on the underside (in this orientation) of the laminate web 20 by nip roller set 32. The ultraviolet cured release coating strips 31 are applied to the backing web 28 by a print tower 33 prior to contact nip roller set 32. The combined laminate web 20 and the backing web 28 travel through roller set 32a and then through a die-cut assembly 34 where the excess die-cut laminate web, designated as laminate web 20a, is separated from the backing web 28 bearing the laminate covered pamphlets 26, and is wound on a roll 36. The laminate covered pamphlets 26 on the backing web 28 are then wound on a roll 38.

Figure 5:
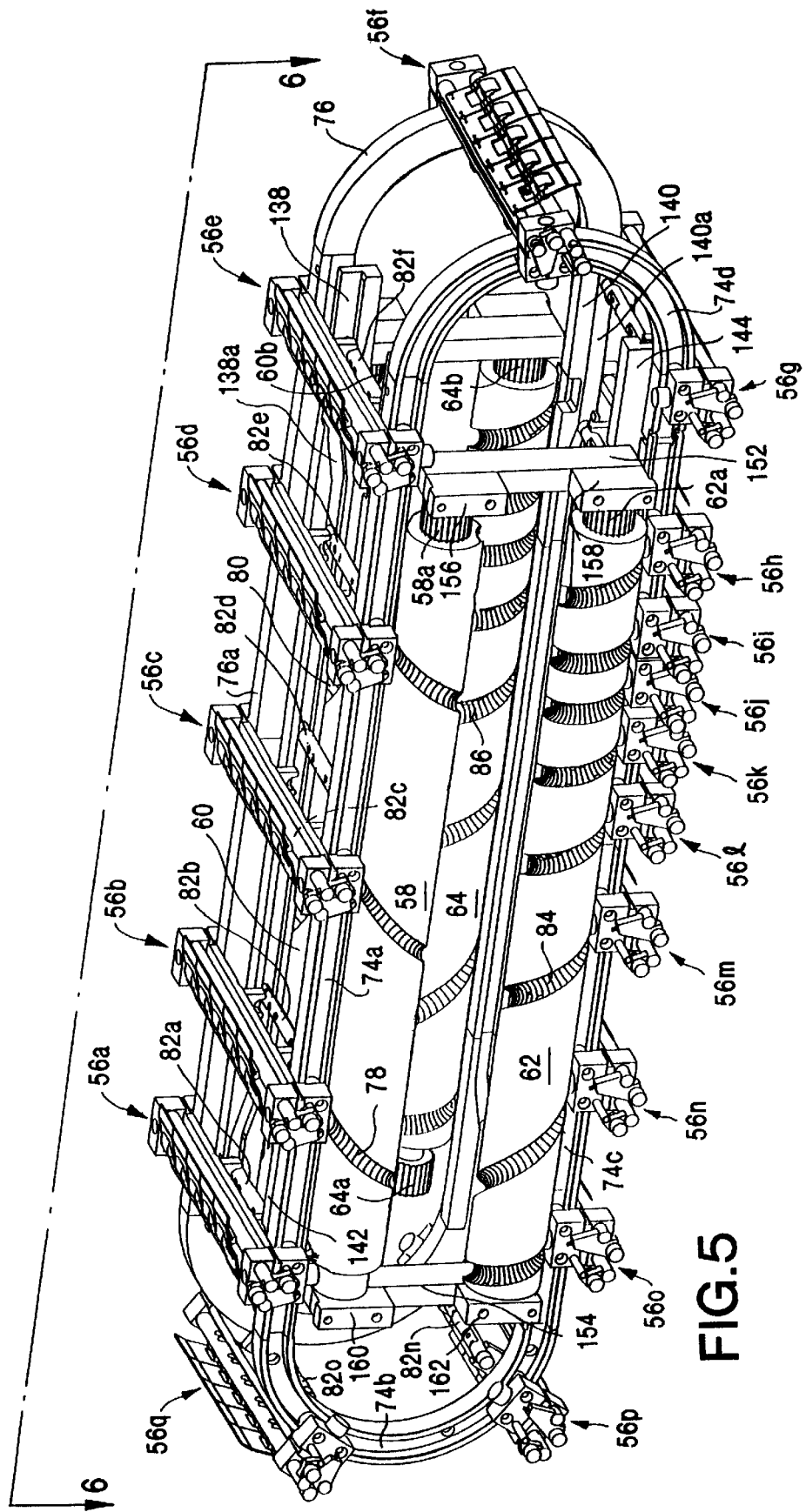
FIG. 5 illustrates a perspective view of the central region of the pamphlet applicator with various component members removed to reveal central components.
Figure 7:
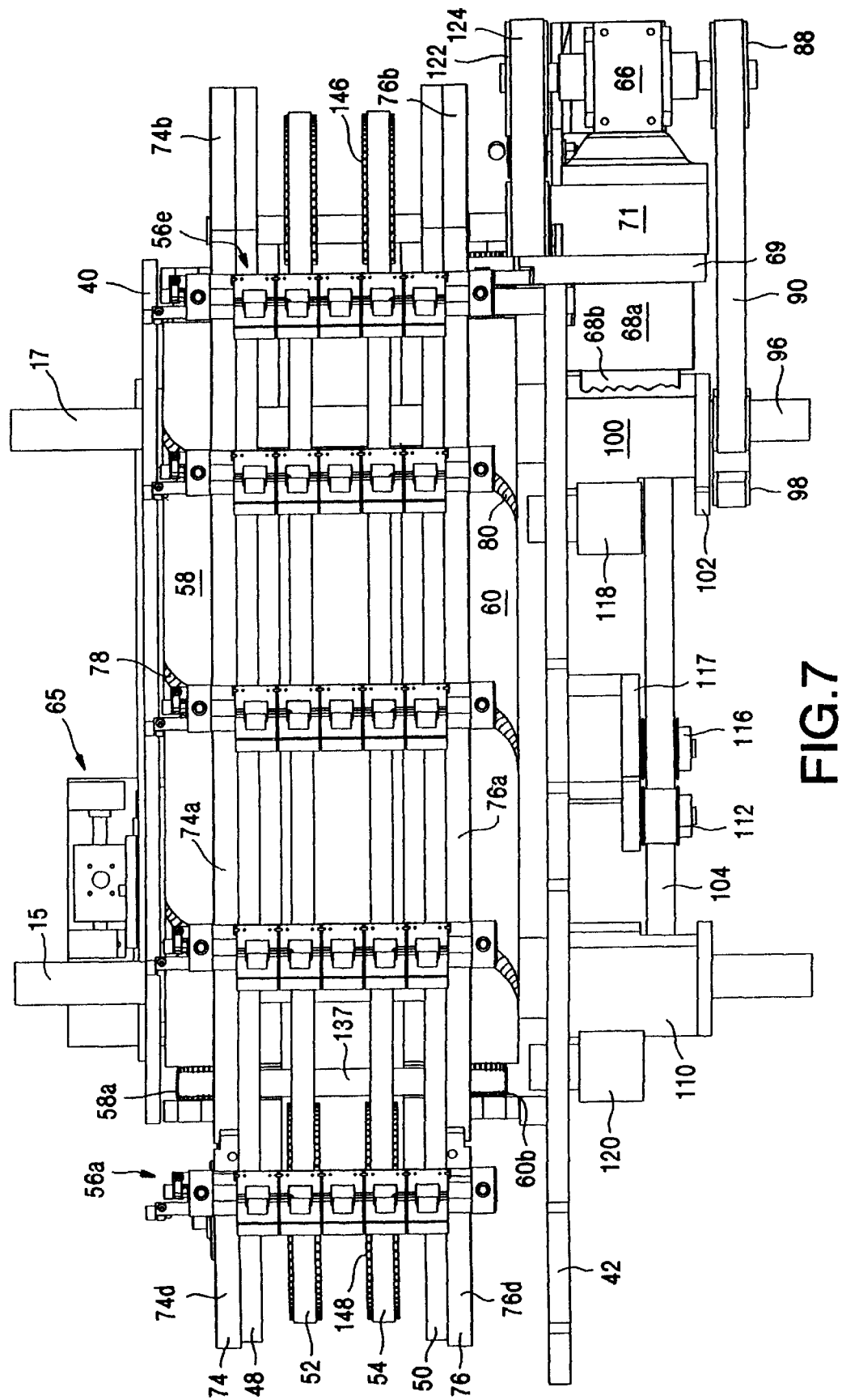
FIG. 7 illustrates a top view of the labeling system with the pick and place assemblies and magazines removed.

The major components of the pamphlet applicator 12 include vertically oriented front and rear mounting plates 40 and 42, dual magazines 44 and 46 secured at a position above and between the front and rear mounting plates 40 and 42, dual pick and place assemblies 45 and 47 located near the lower region of the dual magazines 44 and 46, vertically oriented front and rear track mounting plates 48 and 50 located inboard of the front and rear mounting plates 40 and 42, a dual transport belt drive arrangement having transport belts 52 and 54 and support structure oriented longitudinally between the front and rear track mounting plates 48 and 50, a plurality of pamphlet grasping assemblies 56a–56q mounted transversely across the front and rear track mounting plates 48 and 50, opposing upper cylindrical drive cams 58 and 60 and opposing lower cylindrical drive cams 62 and 64, illustrated in FIG. 5 and other following figures, an actuating assembly 65 of FIG. 7, and a motor driven gear box 66. A servo motor 67, of FIG. 3, secures to standoffs 68a and 68b which are secured successively to mounting plate 69, and a gear box 66 secures to the mounting plate 69 via an intermediate standoff support 71. Positioning rods 15 and 17 extend through the pamphlet applicator 12 and secures to the positionable framework 14. Positionable framework 14 and the positioning rods 15 and 17 position the pamphlet applicator 12 horizontally over the roller 24.

Figure 2:
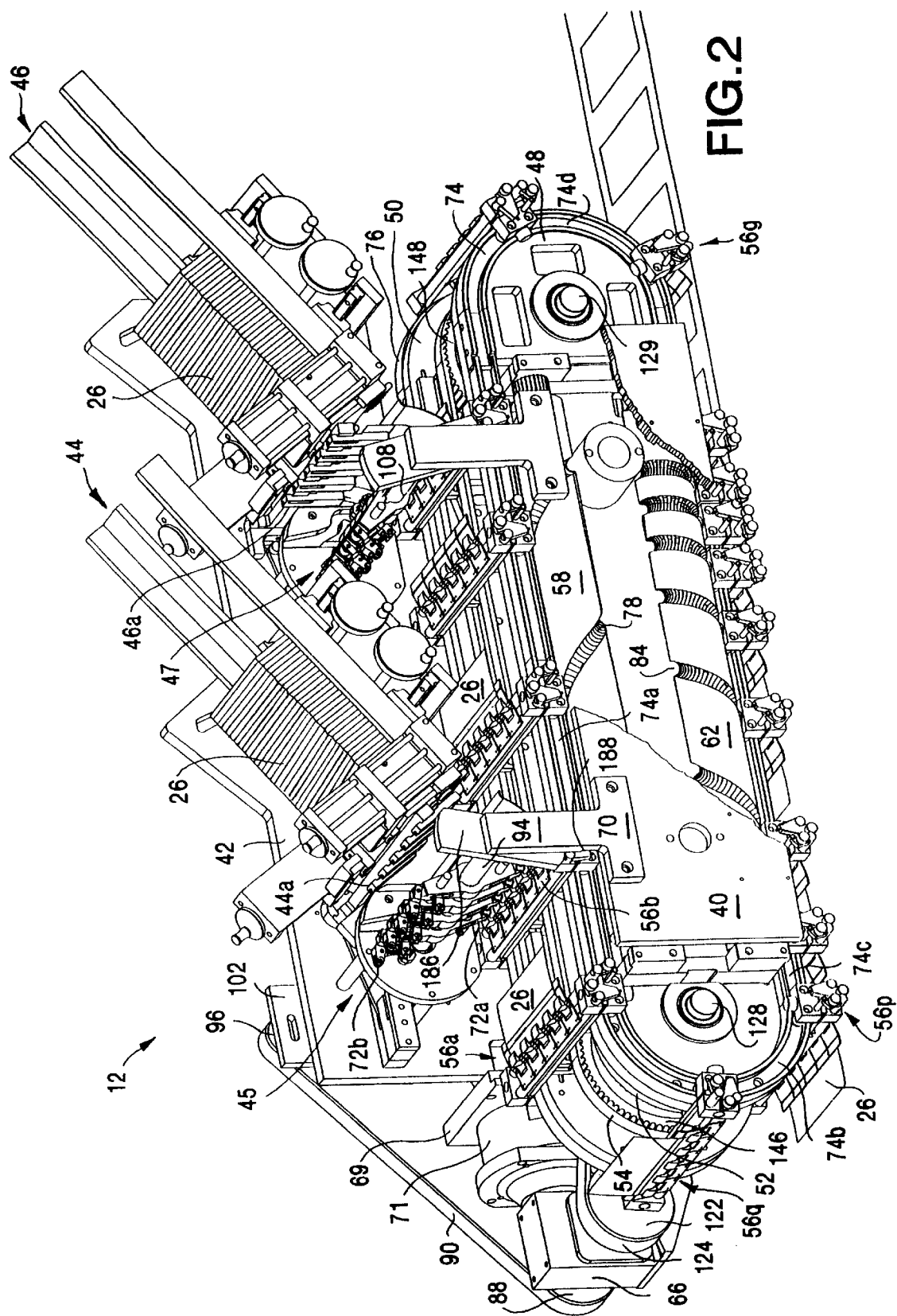
FIG. 2 illustrates a perspective view in partial cutaway of the pamphlet applicator.

FIG. 2 illustrates a perspective view in partial cutaway of the pamphlet applicator 12, where all numerals correspond to those elements previously described. Magazines 44 and 46, being of similar construction, function and operate simultaneously to supply pamphlets 26, of FIG. 1, to their respective pick and place assemblies 45 and 47. High speed pick and place assemblies 45 and 47 are driven by a series of belts and belt sprockets powered by the servo motor 67 and gear box 68 illustrated in FIG. 3. Operation of the high speed pick and place assemblies 45 and 47 and associated components are further described in FIGS. 9–15.

Now, with reference to FIG. 2, the operation and structure of the magazine 44, pick and place assembly 45, and the pamphlet grasping assembly 56a is briefly described. The pick and place assembly 45 mounts between the rear mounting plate 42 and a planar support member 70 extending vertically from the front mounting plate 40. Opposing sets of cam operated friction arms 72a and 72b alternately transfer pamphlets 26 from the magazine 44 to the pamphlet grasping assemblies, such as pamphlet grasping assembly 56a and other pamphlet grasping assemblies. The grasping operation of the pamphlet grasping assemblies 56a–56q is described later in detail in FIGS. 9–15.

Pamphlet grasping assemblies 56a–56q mount transversely and are propelled by various means along and between continuously constructed racetrack-like slots 74 and 76 at the periphery and outer face of the front and rear track mounting plates 48 and 50, respectively. One such propulsion means is the opposing set of upper cylindrical drive cams 58 and 60 located adjacent and parallel to the upper straight slot sections 74a and 76a of the opposing slots 74 and 76. Cam followers, as later illustrated, extend from opposing ends of the pamphlet grasping assemblies 56a–56q to engage the upper cylindrical drive cams 58 and 60. As evidenced by the upper cylindrical drive cam 58, and by the similarly constructed corresponding upper cylindrical drive cam 60, it is noted that spiral cam groove 78 and 80 (FIG. 5) has a prescribed pitch to allow adequate loading time for the pamphlet grasping assemblies 56a–56q while traveling along and between the upper straight slot sections 74a and 76a of the slots 74 and 76 illustrated in this and other FIGS.

Figure 3:
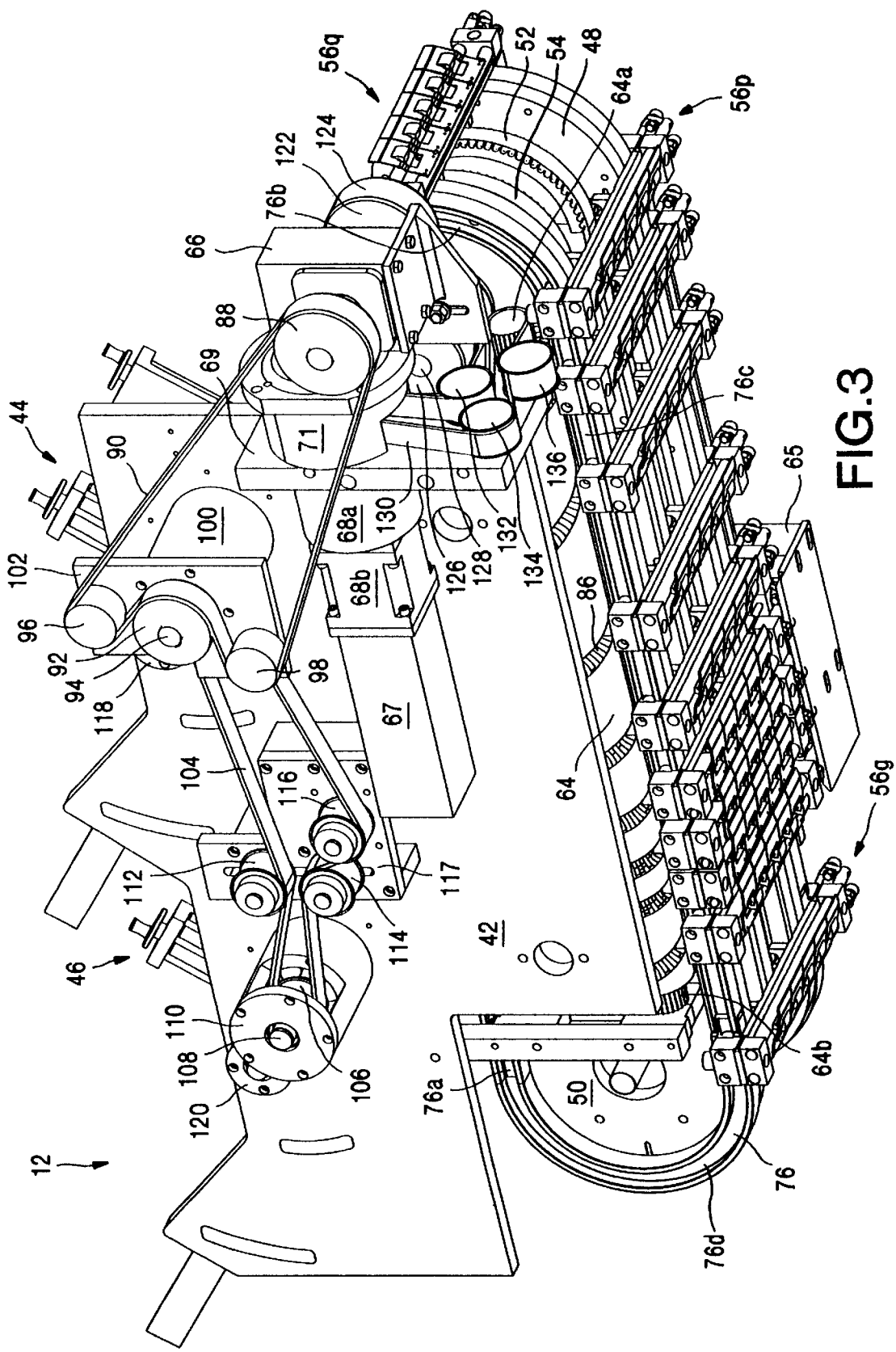
FIG. 3 illustrates a rear view of the pamphlet applicator.

Subsequent to movement along and between the upper straight sections 74a and 76a, the pamphlet grasping assemblies 56a–56q are propelled about the radiused slot sections 74b and 76b of FIG. 3, of this and other FIGS. and by cam operated engagement bars 82a–82o illustrated in FIG. 5. The cam operated engagement bars 82a–82o secure to transport belts 52 and 54 and in general follow a racetrack pattern somewhat parallel to continuous slots 74 and 76. Pamphlet grasping assemblies 56a–56q are sequentially released individually from engagement with and from influence of the upper cylindrical drive cams 58 and 60 and brought individually into engagement with and under the influence of an individual cam operated engagement bar 82a–82o near the ends of the upper straight slot sections 74a and 76a. The cam operated engagement bars 82a–82o power the pamphlet grasping assemblies 55a–56q along the radiused slot sections 74b, and 76b (of FIG. 3). Then, in another sequential operation, pamphlet grasping assemblies 56a–56q are released individually from engagement with and from influence of the cam operated engagement bars 82a–82o and brought individually into engagement with and under the influence of the lower cylindrical drive cams 62 and 64 (of FIG. 5) near the adjacent end of lower straight slot sections 74c and 76c. Lower cylindrical drive cams 62 and 64 (of FIG. 5) exhibit cam grooves 84 and 86, respectively, which have a varying pitch along their lengths starting at a steep pitch at the end nearest the junctions of slot members 74b/74c and 76b/76c (of FIG. 3) and ending at a shallow pitch at the end nearest the junctions of slot members 74c/74d and 76c/76d (of FIG. 3). Individual pamphlet grasping assemblies 56a–56q, when engaged with the steep pitch areas are propelled longitudinally at a relatively rapid rate, and, when engaged in the area of shallow pitch, are propelled longitudinally in close spacing at a relatively slow and controlled rate. Subsequent to decelerated longitudinal propulsion the pamphlet grasping assemblies 56a–56q are sequentially released individually from engagement with and from influence of the lower cylindrical drive cams 62 and 64 and brought individually into engagement with and under the influence of an individual cam operated engagement bars 82a–82o near the end of the straight slot section 74c and 76c (of FIG. 3) which powers the individual cam operated engagement assembly about and along radiused slot sections 74d and 76d (of FIG. 3). Then, in a manner as previously described, pamphlet grasping assemblies 56a–56q are released individually from engagement with and from the influence of the cam operated bars 82a–82n and brought individually into engagement with and under the influence of the upper cylindrical drive cams 58 and 60 (of FIG. 5) near the adjacent ends of the upper straight slot sections 74a and 76a (of FIG. 5).

FIG. 3 illustrates a rear view of the pamphlet applicator 12, where all numerals correspond to those elements previously described. Illustrated in particular is the power distribution to various members of the pamphlet applicator 12 by drive belts and sprockets. Takeoff belt sprocket 88 extends from gear box 66 to power the magazines 44 and 46 and the pick and place assemblies 45 and 47 illustrated in FIG. 1. Belt 90 is driven by takeoff belt sprocket 88 to power belt sprocket 92 and pick and place shaft 94. Drive belt 90 also engages idler belt sprockets 96 and 98. A standoff support 100 and a plate 102 support idler belt sprockets 96 and 98 and one end of the pick and place shaft 94. Power is transferred by belt 104 from a belt sprocket (not shown) aligned over and about a portion of the pick and place shaft 94 interior to the standoff support 100 and delivered to a belt sprocket 106 aligned over and about the pick and place assembly shaft 108 located interior to a standoff support 110. Belt 104 also engages idler belt sprockets 112, 114 and 116 mounted on a standoff plate 117. Belt sprocket 116 drives a vacuum switch (not shown) supplying vacuum to pick and place assemblies 45 and 47. Standoff supports 118 and 120 mount to the rear mounting plate 42 for support of pick and place sucker shafts 47a and 45a of FIG. 1. Another takeoff belt sprocket 122 and belt 124 supplies power to rotate a belt sprocket 126 and drive shaft 128. Drive shaft 128 powers transport belts 52 and 54 upon which cam operated engagement bars 82a–82o (FIG. 8) are secured. Another belt 130 passes through a wall of the standoff support 71 and engages idler belt sprockets 132, 134 and 136, mounted on mounting plate 69, to furnish rotating power to end 64a of the lower cylindrical drive cam 64. Power is further transferred transversely to the other lower cylindrical drive cam 62 by end 64b by a drive belt (not illustrated). Another belt system (not illustrated) provides power to the upper cylindrical drive cam 60 which powers the opposing upper cylindrical drive cam 58 by a transverse drive belt 137 (FIG. 7) at one end of the cylindrical drive cams 58 and 60.

Figure 4:
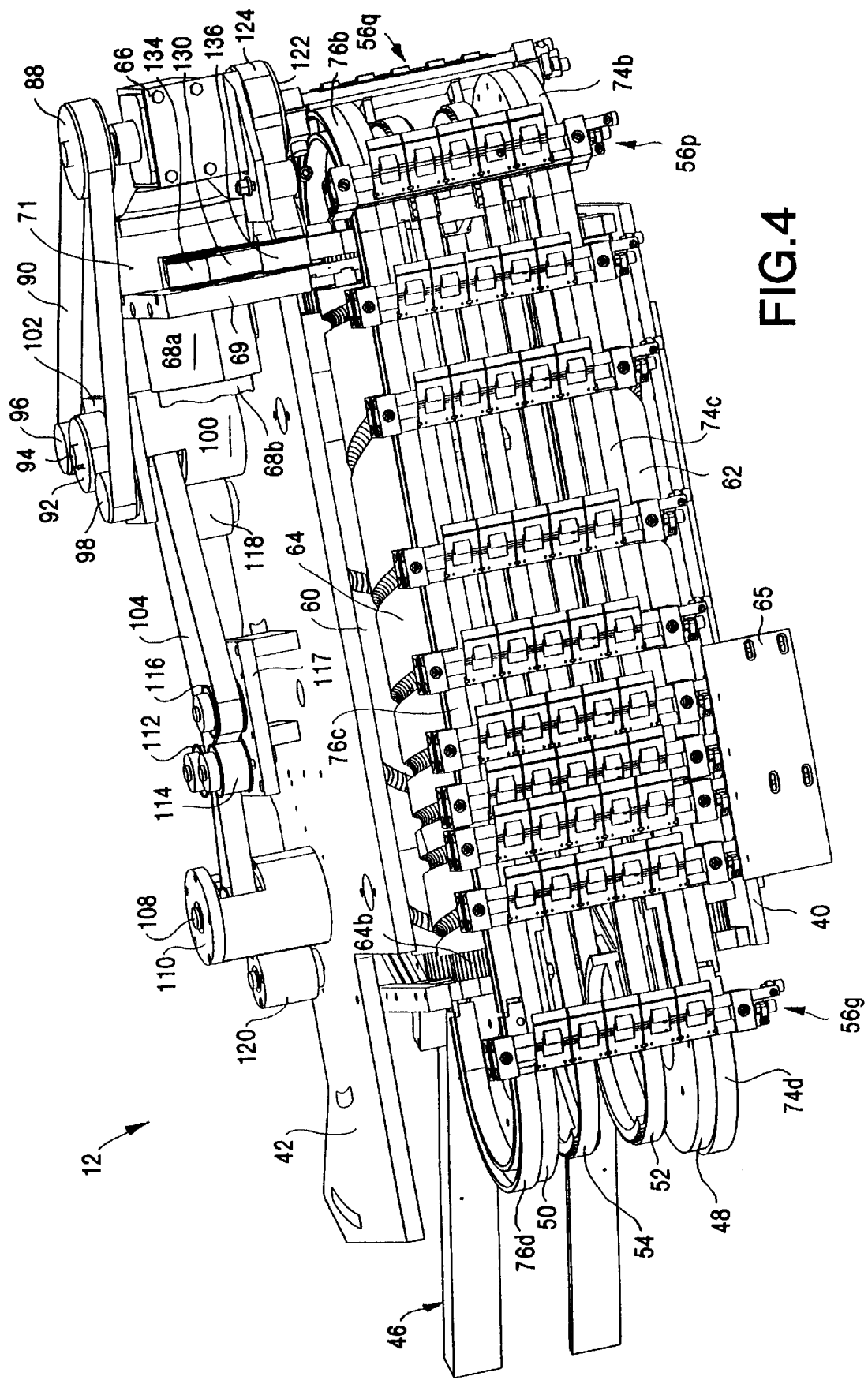
FIG. 4 illustrates a bottom view of the pamphlet applicator.

FIG. 4 illustrates a bottom view of the pamphlet applicator 12, where all numerals correspond to those elements previously described. Illustrated in particular is the decreased spacing of the pamphlet grasping assemblies 56q–56i aligned along and about the bottom portion of the front and rear track mounting plates 48 and 50.

FIG. 5 illustrates a perspective view, where all numerals correspond to those elements previously described, of the central region of the pamphlet applicator 12 with various component members removed to reveal the racetrack-like slots 74 and 76, pamphlet grasping assemblies 56a–56q, upper cylindrical drive cams 58 and 60, and lower cylindrical drive cams 62 and 64. Also illustrated are longitudinally oriented upper and lower cam tracks 138 and 140, having cam slots 138a and 140a, secured longitudinally and parallel with the slot 76. Correspondingly, opposing upper and lower cam tracks 142 and 144, having cam slots 142a and 144a (FIG. 8) secure longitudinally and parallel with the slot 74.

Also illustrated is the relationship of the cam operated engagement bars 82a–82e with pamphlet grasping assemblies 56a–56e, and cam tracks 138, 140, 142 and 144, the operation of which corresponding member components is typical throughout the invention. The cam operated engagement bars 82a and 82f are illustrated in engagement with the pamphlet grasping assemblies 56a and 56e, respectively; and the cam operated engagement bars 82b–82e are illustrated in disengagement with the pamphlet grasping assemblies 56b–56d. Cam tracks 138 and 142 provide for disengagement of the cam operated engagement bars 82b–82e with the pamphlet grasping assemblies 56b–56d at which time simultaneous engagement with the upper and opposing cylindrical drive cams 58 and 60 occurs so that the pamphlet grasping assemblies 56b–56d can be propelled by the upper and opposing cylindrical drive cams 58 and 60.

Figure 8:
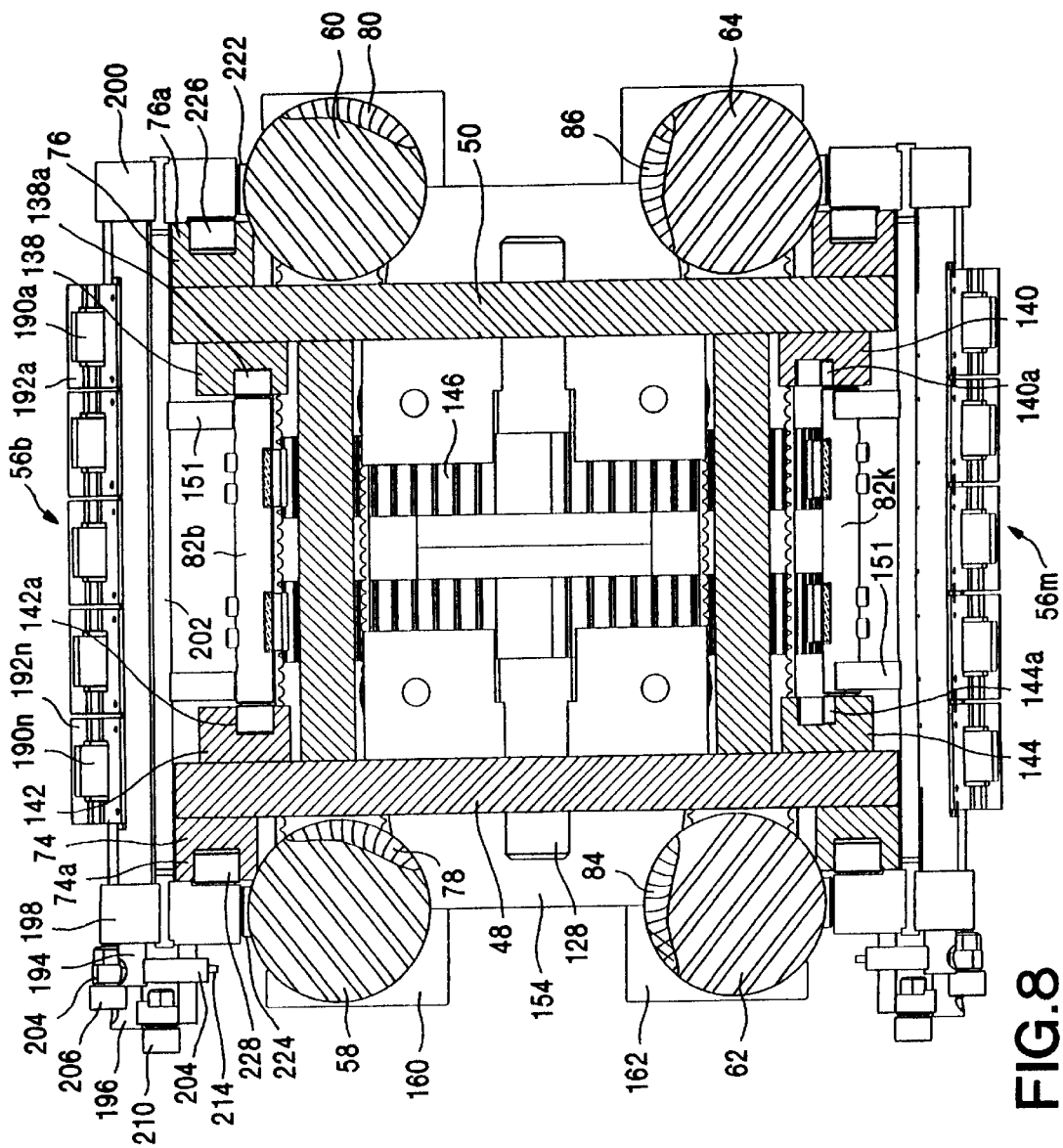
FIG. 8 illustrates a cross sectional view along line 8—8 of FIG. 5.

Also illustrated are members for the support of the upper cylindrical drive cams 58 and 60 and members for support of the lower cylindrical drive cams 62 and 64. As the method of support of the upper cylindrical drive cam 58 and the lower drive cam 62 is similar to that method of support of the upper cylindrical drive cam 60 and lower cylindrical drive cam 64, only the support of upper cylindrical drive cam 58 and the lower drive cam 62 is now described. Vertically oriented support bars 152 and 154 secure to the front track mounting plate 48 as shown in FIG. 8, but not illustrated in FIG. 5 for purposes of brevity and clarity. Upper and lower bearing blocks 156 and 158 secure to opposing ends of the support bar 152 and upper and lower bearing blocks 160 and 162 secure to the opposing ends of the support bar 154. Upper cylindrical drive cam 58 is supported between upper bearing blocks 156 and 160. The lower cylindrical drive cam 62 is supported between the lower bearing blocks 158 and 162. A lower cylindrical drive cam end 62a and an upper cylindrical drive cam end 58a are provided for belt rotation of the upper and lower cylindrical drive cams 58 and 62. Lower cylindrical drive cam end 62a and lower cylindrical drive cam end 64b are linked by a belt (not shown) to simultaneously and synchronously rotate the lower cylindrical drive cams 62 and 64. A drive cam end 60b is also located at the end of the upper cylindrical drive cam 60. The upper cylindrical drive cams 60 and 58 are driven simultaneously and synchronously by a belt 137 of FIG. 7 connecting the upper cylindrical drive cam end 58a to an upper cylindrical cam end 60b.

Figure 6:
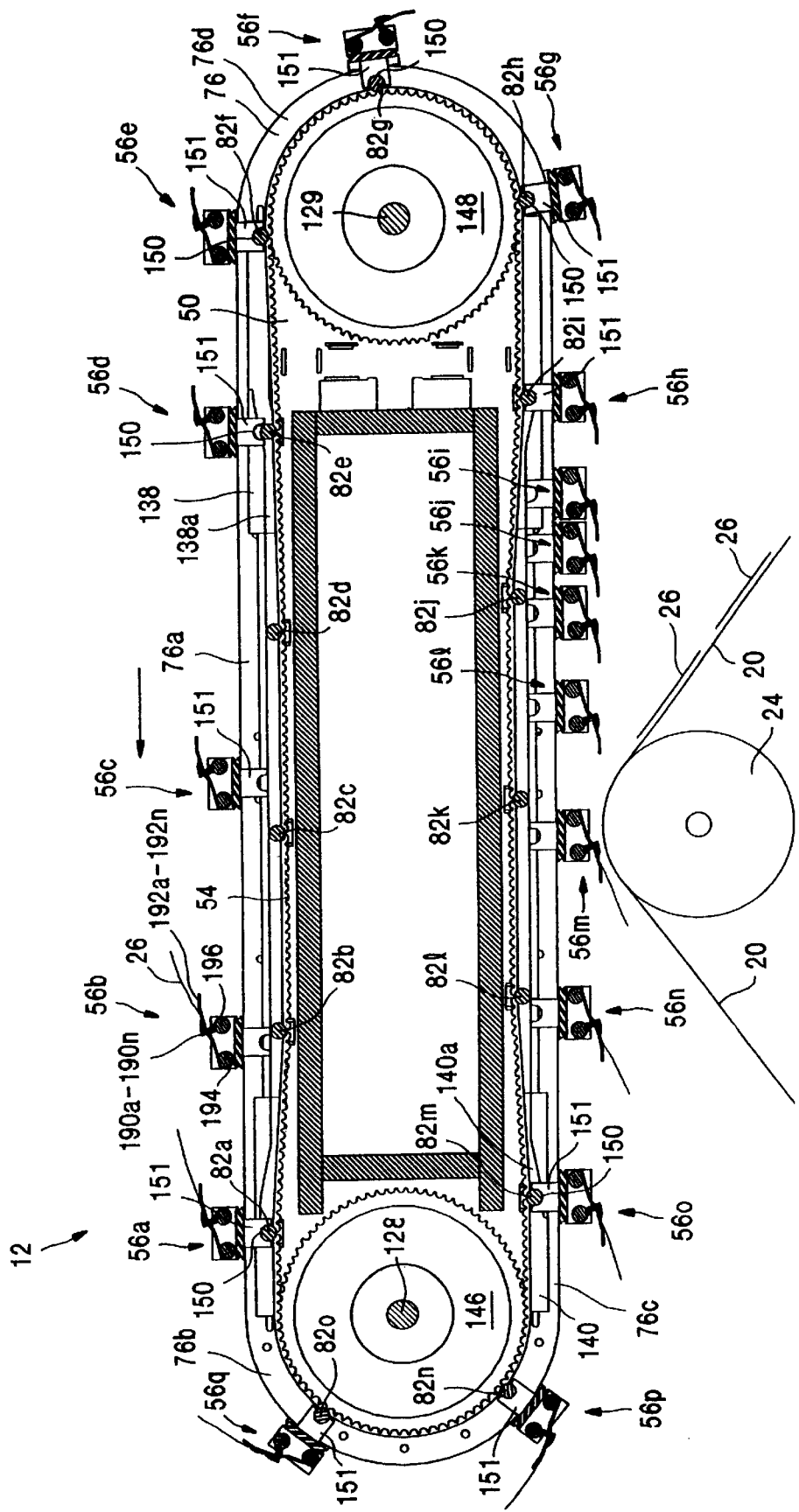
FIG. 6 illustrates a cross sectional side view of the central region of the pamphlet applicator along line 6—6 of FIG. 5.

FIG. 6 illustrates a cross sectional side view of the central region of the pamphlet applicator 12 along line 6—6 of FIG. 5, where all numerals correspond to those elements previously described. Illustrated in particular is the cam arrangement which engages or disengages cam operated engagement bars 82a–82o with the pamphlet grasping assemblies 56a–56q, reference is also made to FIG. 5 and other previously described figures. The upper rear cam track 138, the lower rear cam track 140, rear track mounting plate 50 transport belt 54, being mirror images of the like members illustrated in the other figures of the upper front cam track 142, the lower front cam track 144, the front track mounting plate 48 and the transport belt 52; respectively is now described. Transport belt 54 aligns over and about belt sprockets 146 and 148 which are supported by drive shaft 128 and shaft 129 respectively. Drive shaft 128 and shaft 129 are supported by front and rear mounting plates 48 and 50. The cam operated engagement bars 82a–82n secure to the transport belt 54 and to the corresponding transport belt 52 (not illustrated).

With reference to the area about the belt sprocket 148 it can be seen that cam engagement bars 82h, 82g and 82f are fully engaged with the bottom semicircular engagement cutouts 150 of the pamphlet engagement assemblies 56g, 56f, and 56e about the slotted member 76. Preceding the position of the pamphlet engagement bar 82f, the cam engagement bars, such as bar 82e, enter the rear upper cam slot 138a and are urged downwardly to disengage the engagement bar 82e from engagement with the semi circular cutout 150 at the lower region of the pamphlet engagement assemblies. As the disengagement occurs, the upper cylindrical drive cams 58 and 60, having a steep pitch and as illustrated in FIG. 5, appropriately and simultaneously engages the pamphlet grasping assembly 56d to urge and propel it along the straight section 76a of the slotted member 76 at a prescribed constant speed and spacing.

At the opposite end of the straight section 76a of the slotted member 76, the cam slot 138a allows the cam operated engagement bar 82a to engage the semi-circular cutout 150 of the pamphlet grasping assembly 56a, and, simultaneously, the upper cylindrical drive cams 58 and 60 disengage from the pamphlet grasping assembly 56a to relinquish propulsion of the pamphlet grasping assembly 56a by the transport belt 54 about the radiused slot section 76b. This process repeats itself in general along the lower region of the pamphlet applicator 12, the cam slot 140a, of the lower cam track 140 proceeds to urge the cam operated bar 82m from disengagement with the semi circular cut-out 150 of the pamphlet grasping assembly 56o. The pamphlet grasping assemblies 56o through 56i are urged along the lower track member 76c at different rate speeds and spacings by the lower cylindrical drive cams 62 and 64 by the variable pitch of the lower cylindrical drive cams 62 and 64. At the opposite end of the lower track member 76c, the cam operated engagement bar 82i is brought into contact with the semi-circular cutout 150 of the pamphlet grasping assembly 56h whereby the pamphlet grasping assembly 56h is urged about the radiused slot section 76d by the transport belt 54.

Pamphlets 12 are introduced into pamphlet grasping assemblies such as pamphlet grasping assembly 56b along the upper region of the pamphlet applicator 12 as later described in detail, and carried about the pamphlet applicator 12 to the pamphlet applicator 12 lower region.

Disengagement of the pamphlet grasping assemblies 56a–56q from the cam operated engagement bars 82a–82n relinquishes control of the pamphlet grasping assemblies 56a–56q from the transport belts 54 (and 52) to allow speed and spacing of the pamphlet grasping assemblies 56a–56q to be controlled by the upper cylindrical drive cam pairs 58 and 60, and by the lower cylindrical drive pairs 62 and 64. As can be seen at the lower region of the pamphlet applicator 12 the spacing between pamphlet grasping assembly 56o and 56n is generally wide and is greater than the spacing between pamphlet grasping assemblies 56n and 56m ranging in ever decreasing spacing to a close spacing shown such as between pamphlet grasping assemblies 56j and 56i.

The positionable actuating assembly 65 illustrated in FIG. 1 is located at a desirable point adjacent to the illustrated position of the lower pamphlet grasping assemblies 56n–56i to cause cam actuated release of a pamphlet 26, which is held in a individual pamphlet grasping assemblies 56b–56q members at a desired spacing, i.e., if a wide spacing on the laminate web 20 of FIG. 1 is desired, the actuating assembly 65 would be located relatively close to pamphlet grasping assembly 56n, if a close spacing were desired then the actuating would be located relatively close to pamphlet grasping assembly 56i. It can be seen that a great degree of adjustability with respect to closeness of spacing can be maintained by appropriate adjustment of the actuating assembly 65 with respect to the pamphlet grasping assemblies 56n–56i. Correspondingly, the location of the roller 24 shown in FIG. 1 is referenced to the location of the actuating assembly 65 for proper application to the laminate web 20. Placement of a pamphlet 26 from the magazine 44 and 46 is later described in detail. Actuator assembly 65 can also be activated.

FIG. 7 illustrates a top view of the labeling system 10 with the pick and place assemblies 45 and 47 and the magazines 44 and 46 removed to reveal the transport belts 52 and 54 and the pamphlet grasping assemblies 56a–56e, where all numerals correspond to those elements previously described.

FIG. 8 illustrates a cross sectional view along line 8—8 of FIG. 5, where all numerals correspond to those elements previously described.

Figure 9:
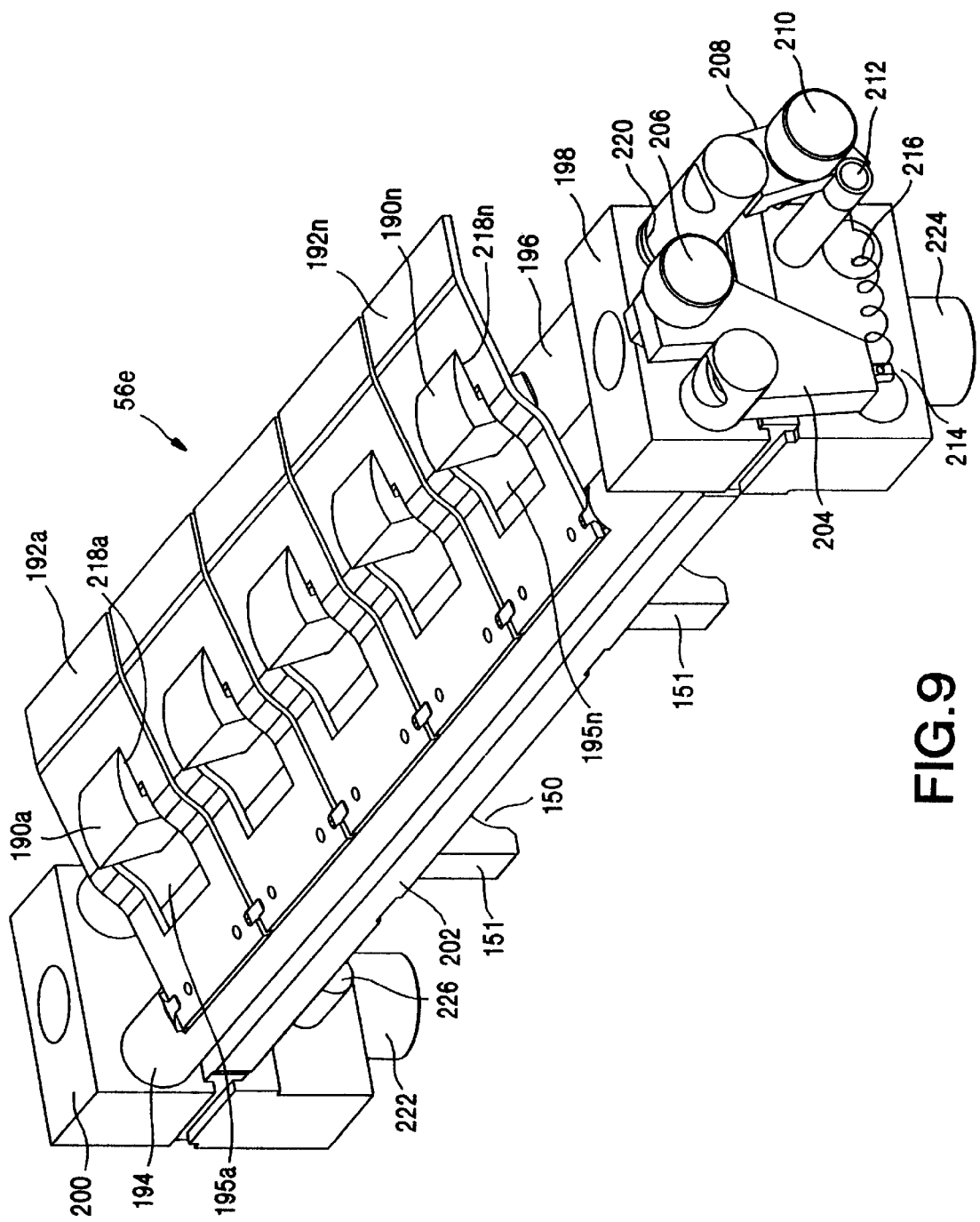
FIG. 9 illustrates an isometric view of a pamphlet grasping assembly.

FIG. 9 illustrates an isometric view of pamphlet grasping assembly 56e, where all numerals correspond to those elements previously described. Pamphlet grasping assembly 56e, which is similar to the other pamphlet grasping assemblies 56a–56d and 56f–56q is now described. The pamphlet grasping assembly 56e mounts transversally along and between opposing slotted members 74 and 76 of FIG. 2 and includes a plurality of upper grasping fingers 190a–190n interacting with a plurality of lower grasping fingers 192a–192n. Upper grasping fingers 190a–190n and lower grasping fingers 192a–192n are actuated to receive and grasp pamphlets 26. Spring tensioned lower grasping finger actuator rod 194 and spring tensioned upper grasping finger rod 196 extend through the upper portion opposing mounting blocks 198 and 200 and are rotatable therein. Also extending between the mounting blocks 198 and 200 is a crossbar member 202. Lower grasping fingers 192a–192n attach to the lower grasping finger actuator rod 194 and the upper grasping fingers 190a–190n attach to the upper grasping finger actuator rod 196. It is noted that the upper grasping fingers 190a–190n extend through and overlap with a plurality of rectangular shaped holes 195a–195n. The overlaps 218a–218n between the bottom of the upper grasping fingers 190a–190n and the upper surface of the lower grasping fingers 192a–192n receive and grasp pamphlets 26 from an overhead magazine as depicted in FIGS. 10–15. Attached to the outer end of the lower grasping finger actuator rod 194, which extends outwardly from the mounting block 198, is a configured plate 204 having a cam follower 206 attached to its upper end. Attached to the outer end of the upper finger grasping actuator rod 196, which extends outwardly from the mounting block 198, is a configured plate 208 having a cam follower 210 attached to its lower end. A spring mount post 212 mounts to and extends horizontally from the lower portion of the mounting block 198 and a spring mounting post 214 extends vertically and downwardly from the configured plate 204 to serve as mounts for a spring 216. Spring 216 holds the lower grasping finger actuator rod 194 in a counterclockwise poise thus causing the lower grasping fingers 192a–192n to exert pressure against the upper grasping fingers 190a–190n to contribute to maintaining pressure across the overlap areas 218a–218n. A torsion spring 220 about the upper finger grasping actuator rod 196 maintains clockwise poise causing the upper grasping fingers 190a–190n to maintain a precise home position when not cam activated to also contribute to maintaining pressure across the overlap areas 218a–218n.

Cam followers 222 and 224 extend vertically from the lower side of mounting blocks 200 and 198, respectively, to engage the cam grooves 78 and 80 of the upper cylindrical drive cams 58 and 60 or the cam grooves 84 and 86 of the lower cylindrical drive cams 62 and 64. Cylindrical cam followers 226 and 228 (see FIG. 8) extend inwardly from the mounting blocks 200 and 198 to engage slotted racetrack-like members 76 and 74, respectively.

MODE OF OPERATION

FIGS. 10–15 illustrate, in sequential steps, the feeding of a pamphlet 26 from the magazine 44 of the pick and place assembly 45 to one of the pamphlet grasping assemblies 56a–56q, where all numerals correspond to those elements previously described. Illustrated in particular is the loading of pamphlet grasping assembly 56e. Magazine 46 and the pick and place assembly 47 are similar in construction and function and are located to place a pamphlet 26 in alternate grasping assemblies 56a–56q in concert with magazine 44 and pick and place assembly 45.

Pick and place assembly 45 centers about a rotary pick and place shaft 94 upon which are mounted a plurality of symmetrically shaped and parallel mounted and spaced rotary support members 164a–164n. Rotary support member 164a, for example, includes opposing actuated friction arms 72a and 72b pivotally mounted at opposing ends of the rotary support member 164a. Friction arms 72a and 72b are mirror image-likenesses of each other and perform like functions. Only friction arm 72a is described for the purpose of brevity and clarity. Friction arm 72a mounts to a pivot 166. A frictional wiper member 168, such as of rubber, soft plastic or other such pliable material, is located at and extends slightly beyond one end of the friction arm 72a. The pivoted friction arm 72a connects by a shaft 170 and a compression spring (not illustrated) to a bracket 172 which secures to the rotary shaft 174. Rotary shaft 174 pivots in the rotary support member 164a. A cam follower 176 is attached to rotary shaft 174. The interaction of the cam follower 176 and cam 178 cause the friction arms, such as friction arm 72a, to clear the vacuum arm 184a and to then apply substantial pressure between friction arms 72a and the curved backing plate 182 to initiate motion of the pamphlet 26 from the magazine 44.

The pick and place assembly 45 also includes one or more vacuum cup pickups 184 for transfer of a pamphlet 26 to the curved reciprocating backing plate 182. The reciprocating curved backing plate 182, during each pamphlet placement, is positioned to accept the incoming pamphlet 26 and then, in concert with the frictional wiper member 168, to deliver the pamphlet 26 for loading and acceptance by one of the pamphlet grasping assemblies 56a–56q. Acceptance of the pamphlet 26 by the pamphlet grasping assemblies 56a–56q, such as pamphlet grasping assembly 56e, is predicated on the actuation of the cam followers 206 and 210 to position the lower and upper grasping fingers 192a–192n and 190a–190n, thus opening the overlap areas 218a–218n illustrated in FIG. 9, as well as FIG. 14. A cam 186, illustrated in FIG. 2, secured to the outboard end of the pick and place shaft 94, rotates with the pick and place shaft 94 to actuate the cam follower 206 to position the upper grasping fingers 190a–190n. A cam slot 188, illustrated in FIG. 2, on the inner lower region of support member 70, actuates the cam follower 210 to position the lower grasping fingers 192a–192n. These cam actuations ready the overlap areas 118a–118n for acceptance of a pamphlet 26.

Figure 10:
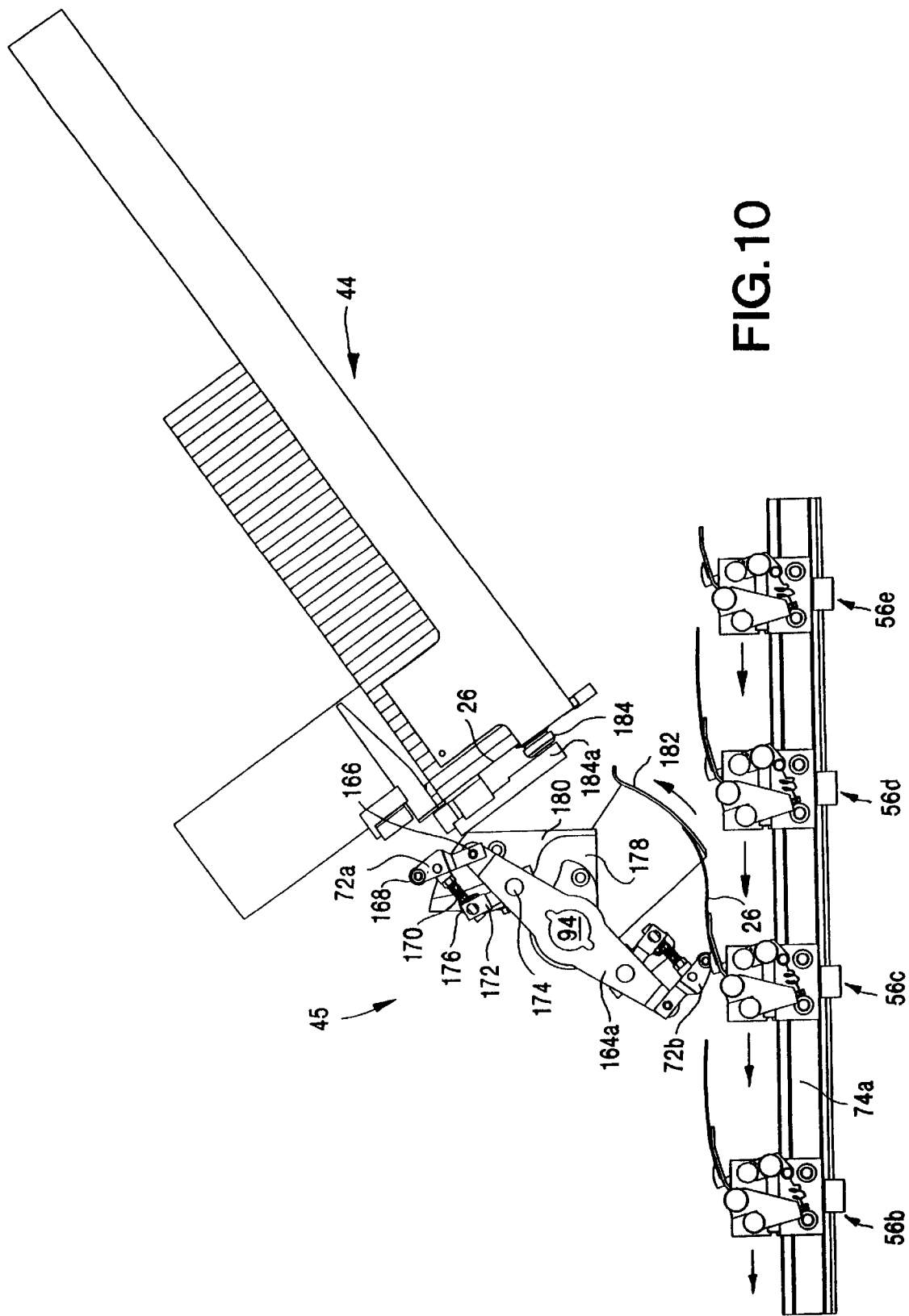

FIG. 10 illustrates the vacuum pickup 184 picking a pamphlet 26 from the magazine 44, where all numerals correspond to those elements previously described. The reciprocating curved backing plate 182 moves upwardly from a prior pamphlet placement in pamphlet grasping assembly 56c, toward the first pamphlet 26 residing in magazine 44 so that the pamphlet 26 may be subsequently placed in the oncoming pamphlet grasping assembly 56e.

Figure 11:
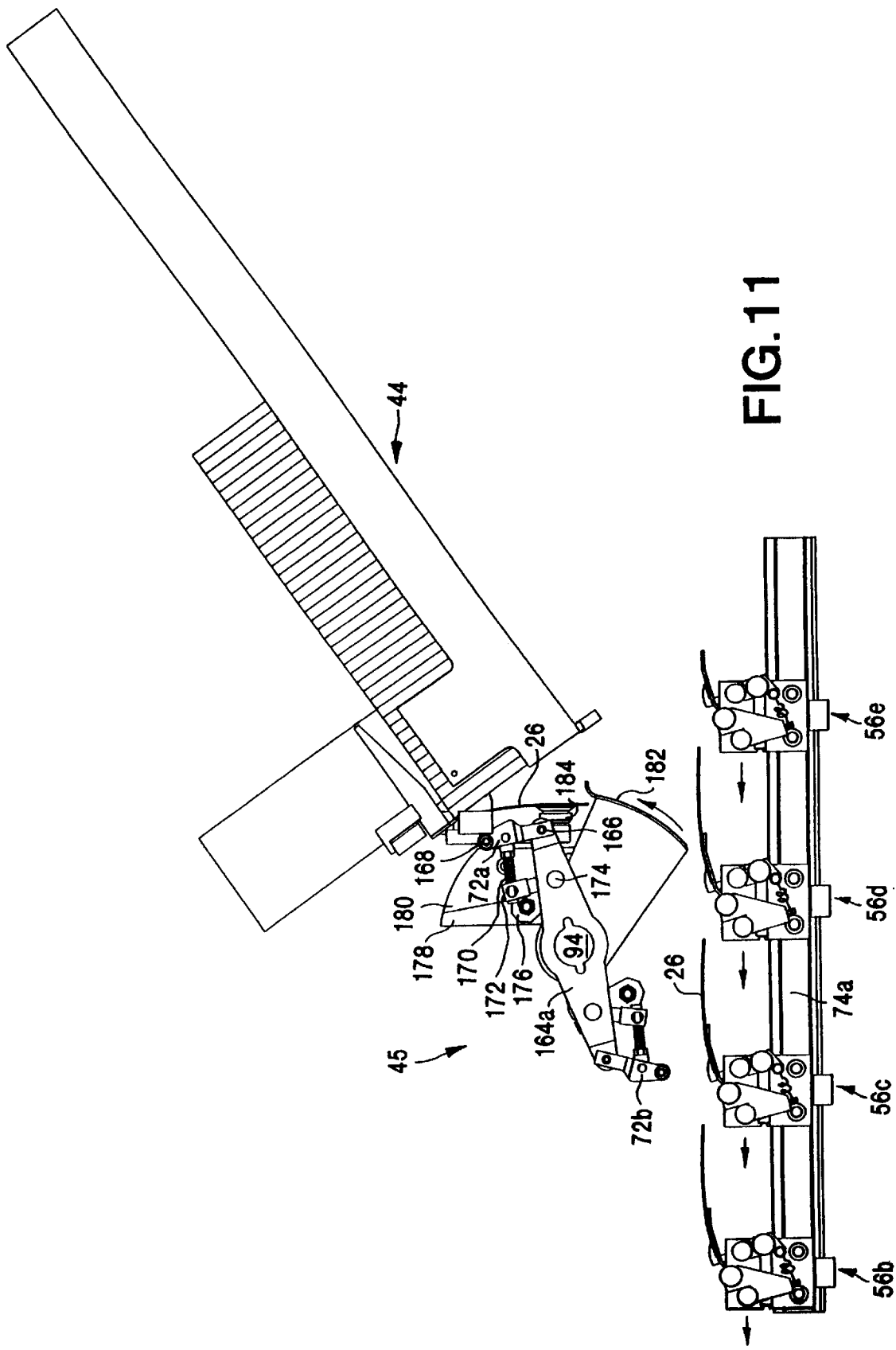

FIG. 11 illustrates partial transfer of the pamphlet 26 from the magazine 44 by the vacuum pickup 184 to the yet upwardly moving reciprocating curved back plate 182, where all numerals correspond to those elements previously described.

Figure 12:
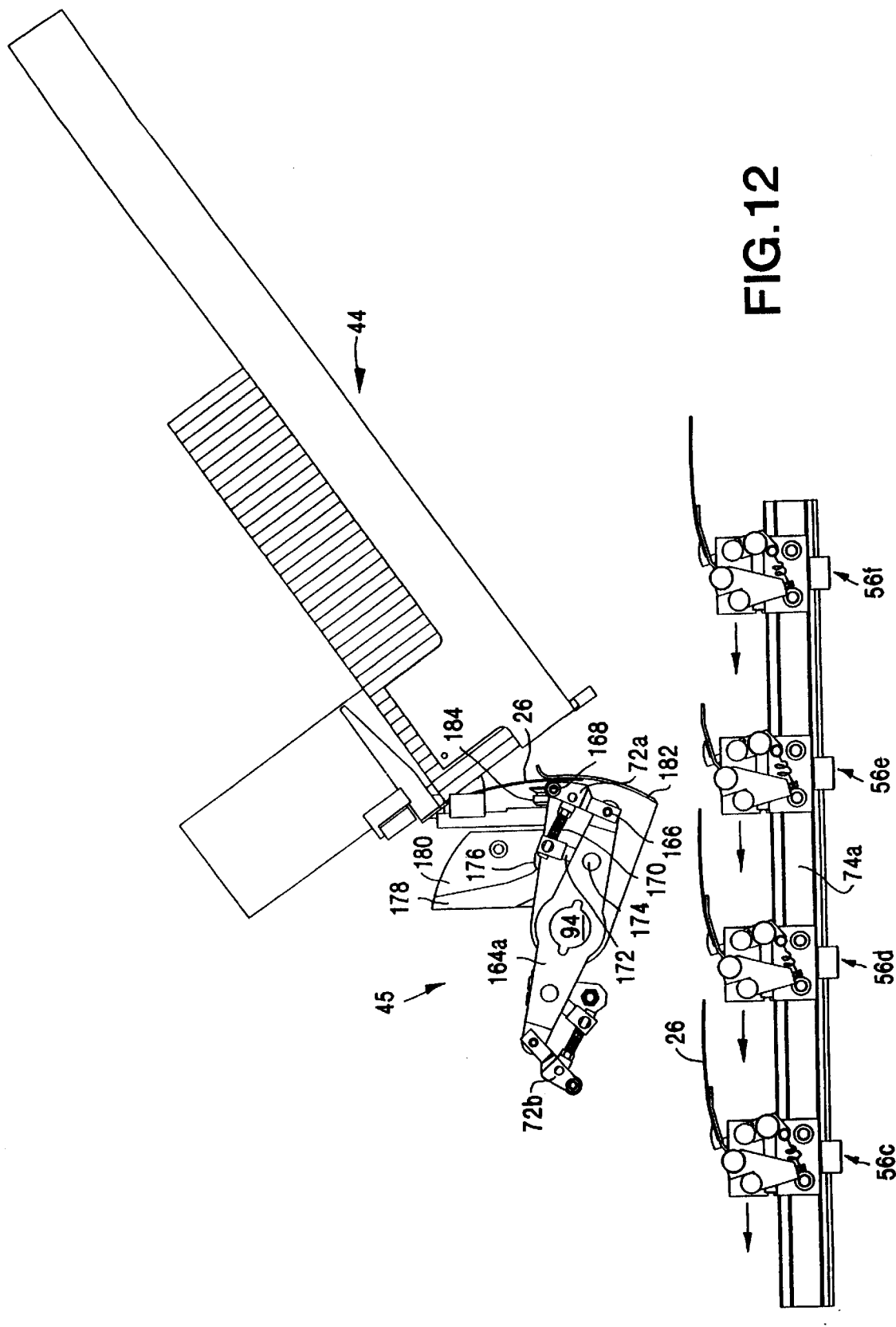

FIG. 12 illustrates transfer of the pamphlet 26 from the magazine 44 by the vacuum pickup 184 to the reciprocating curved back plate 182, where all numerals correspond to those elements previously described. The reciprocating curved back plate 182 at this point has reached its maximum upward travel and is poised to begin downward travel. Frictional wiper member 168 frictionally engages the pamphlet 26 to hold the pamphlet 26 against the reciprocating back plate 182. It is noted that the pamphlet grasping assembly 56e is being positioned beneath the pick and place assembly 45 for acceptance of a pamphlet 26.

Figure 13:
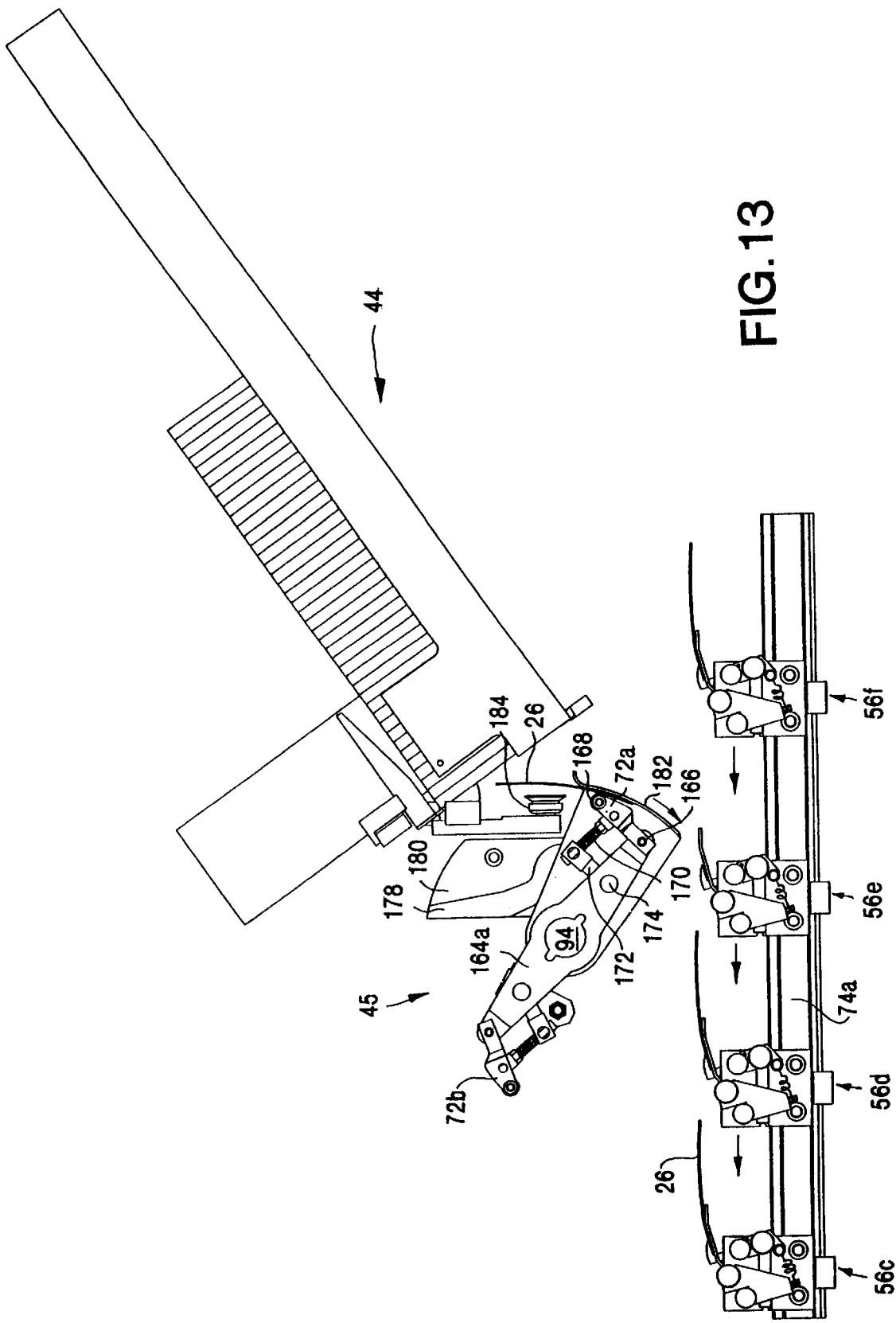

FIG. 13 illustrates transition of the pamphlet 26 along the reciprocating curved back plate 182 as urged by the frictional wiper member 168, where all numerals correspond to those elements previously described. The reciprocating curved back plate 182 continues in a downward movement but, due to cam action, lags the rotational rate of the descending frictional wiper member 168. The frictional wiper member 168, still in frictional engagement with the pamphlet 26, slides the pamphlet 26 along the reciprocating curved back plate 182 to position the leading edge of the pamphlet 26 forward of the leading edge of the reciprocating curved back plate 182 so that the leading edge of the pamphlet 26 may be subsequently grasped by the pamphlet grasping assembly 56e.

Figure 14:
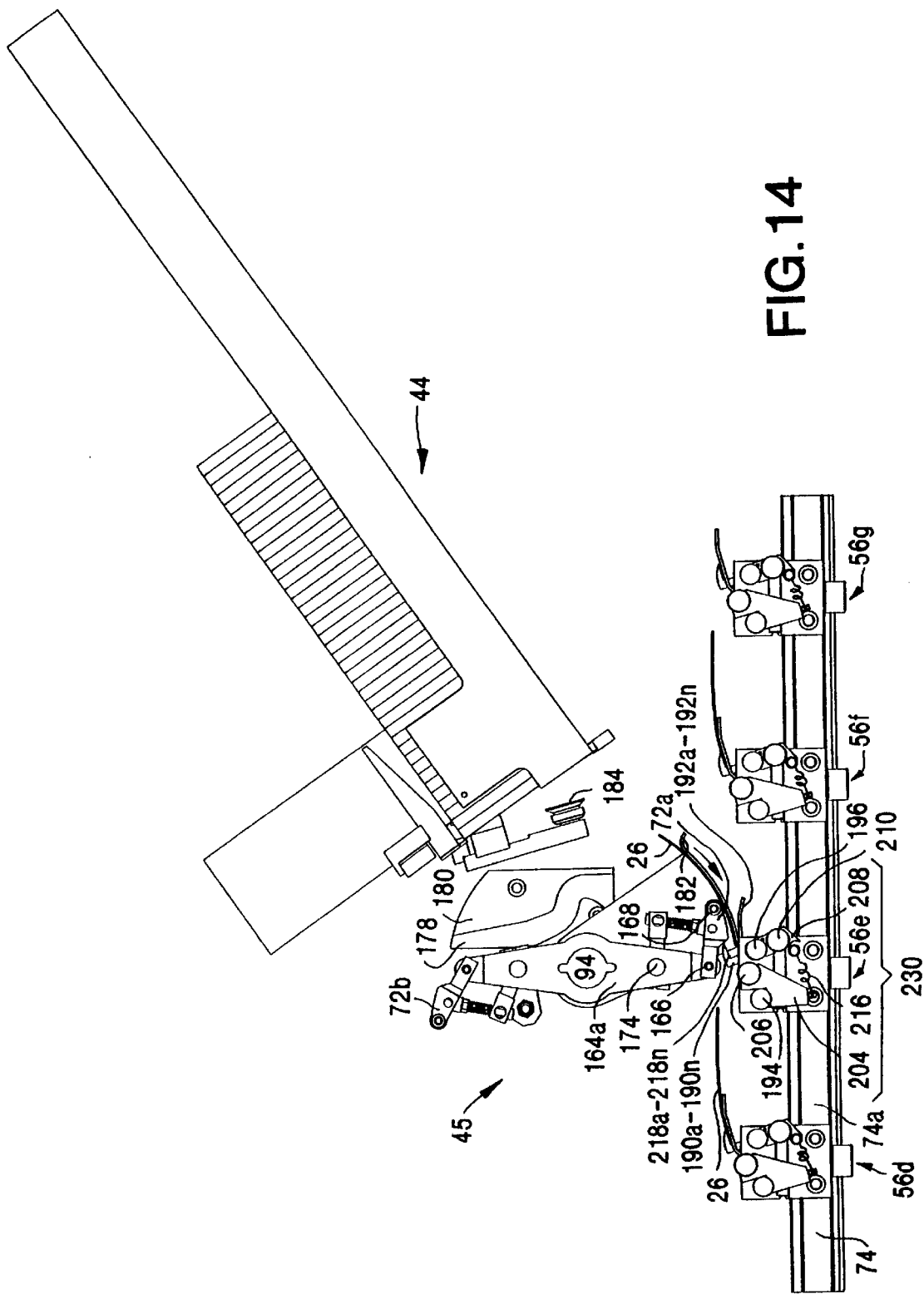

FIG. 14 illustrates insertion of the leading edge of the pamphlet 26 into the open finger members 190a–190n and 192a–192n of pamphlet grasping assembly 56e opened as previously described, where all numerals correspond to those elements previously described. The frictional wiper member 168 continues to urge the pamphlet 26 in sliding engagement with the reciprocating backing plate 182 in to the open finger members 190a–190n and 192a–192n. The course of the reciprocating backing plate 182 is then reversed, as illustrated in FIG. 15 to assist in transition of the next pamphlet 26 in magazine 44. To aid and facilitate loading of the pamphlet grasping assembly 56e, the velocity of the pamphlet grasping assembly 56e is slowed, for purposes of example and illustration, to about one-third of its original speed for a short period, such as indicated by area 230, along slotted member 74 (and 76). Cam groove 78 in the upper cylinder drive cam 58 and cam groove 80 in the upper cylinder drive cam 60 are adequately pitched to reduce the velocity of the pamphlet grasping assembly 56e along area 230, thereby allowing the pamphlet grasping assembly 56e to loiter in the vicinity of area 230 so that pamphlet placement into the awaiting pamphlet grasping assembly members occurs in a precise manner and fashion which is not hampered by exorbitant speed. Each pamphlet grasping assembly 56a–56q is likewise slowed for pamphlet insertion at area 230.

FIG. 15 illustrates grasping of the leading edge of the pamphlet 26 by the finger members 190a–190n and 192a–192n, which are closed by release or de-actuation of the cam followers 206 and 210 by cam 186 and cam slot 188, respectively, where all numerals correspond to those elements previously described. Friction arm 72b and vacuum pickup 184 are positioned to handle and process another pamphlet 26 in a manner as just described.

Various modifications can be made to the present invention without departing from the apparent scope hereof.

I claim:

1. A labeling system comprising:
   a. a laminate web supply roll containing a supply of laminate web having an adhesive facing for receiving and affixing pamphlets;
   b. a backing web supply roll containing a backing web for mating with said adhesive facing of said laminate web and for captivating pamphlets affixed to said adhesive facing of said laminate web;
   c. a takeup roll for storing said laminate web and backing web with pamphlets captivated therebetween;
   d. a magazine for holding a supply of pamphlets;
   e. a pick and place assembly associated with said magazine, said pick and place assembly including a pickup mechanism for picking pamphlets individually from said magazine;
   f. a plurality of pamphlet grasping assemblies for receiving pamphlets from said pick and place assembly and depositing them onto said adhesive facing of said laminate web; and,
   g. a nip roller set located downstream from both said laminate web supply roll and said backing web supply roll and upstream from said takeup roll for compressing said laminate web against said backing web with pamphlets captivated therebetween.

2. The labeling system in accordance with claim 1, and further including a print tower located downstream from said backing web supply roll for applying spaced strips of release coating material to said backing web.

3. The labeling system in accordance with claim 1, and further including a die-cut assembly located between said nip roller set and said takeup roll for cutting excess laminate web from said backing web.

4. A labeling system comprising:
   a. a magazine for holding a supply of pamphlets;
   b. a pick and place assembly associated with said magazine, said pick and place assembly including a pickup mechanism for picking pamphlets individually from said magazine;
   c. elongated opposing slotted members positioned below said pick and place assembly, each opposing slotted member comprising upper and lower straight slot sections and radiused end slot sections joining said upper and lower straight slot sections and forming therewith a continuous racetrack-like slot;
   d. a plurality of pamphlet grasping assemblies for receiving pamphlets from said pick and place assembly, each pamphlet grasping assembly being positioned transversely to said opposing slotted members and having cam followers disposed within said racetrack-like slots;
   e. a transport belt positioned between said opposing slotted members;
   f. a plurality of cam operated engagement bars carried by said transport belt and movable into and out of engagement with said pamphlet grasping assemblies, said cam operated engagement bars being disengaged from said pamphlet grasping assemblies along the lengths of said upper and lower straight slot sections of said opposing slotted members and moving into engagement with said pamphlet grasping assemblies along said radiused end slot sections of said opposing slotted members for propelling said pamphlet grasping assemblies around said radiused end slot sections; and,
   g. upper and lower cylindrical drive cams engageable with said pamphlet grasping assemblies for propelling said pamphlet grasping assemblies along said upper and lower straight slot sections of said opposing slotted members.

5. The labeling system in accordance with claim 4, and wherein said upper drive cam has a spiral cam groove having a pitch which causes said pamphlet grasping assemblies to travel at varying speeds allowing time for pamphlet transfer from said pick and place assembly to said pamphlet grasping assemblies, and said lower cylindrical drive cam has a spiral cam groove having a varying pitch beginning with a decreasing steep pitch and ending with an increasing shallow pitch.

6. The labeling system in accordance with claim 4, and wherein each pamphlet grasping assembly includes a number of upper grasping fingers and an equal number of lower grasping fingers for receiving and grasping a pamphlet therebetween.

7. The labeling system in accordance with claim 4, and wherein said pick and place assembly further includes a rotary support member having two ends, each end having a friction arm pivotally attached thereto, and each friction arm carrying a frictional wiper member.

8. The labeling system in accordance with claim 7, and wherein said pick and place assembly further includes a reciprocating curved backing plate which, in concert with a frictional wiper member, operates to deliver a pamphlet to a said pamphlet grasping assembly.

9. A labeling system comprising:
   a. dual magazines each for holding a supply of pamphlets;
   b. dual pick and place assemblies associated with said dual magazines, one of said dual pick and place assemblies being located adjacent to the bottom of one of said dual magazines, and the other of said dual pick and place assemblies being located adjacent to the bottom of the other of said dual magazines, each pick and place assembly including a pickup mechanism for picking pamphlets individually from the associated dual magazine;
   c. elongated opposing slotted members positioned below said dual pick and place assemblies, each opposing slotted member comprising upper and lower straight slot sections and radiused end slot sections joining said upper and lower straight slot sections and forming therewith a continuous racetrack-like slot;
   d. a plurality of pamphlet grasping assemblies for receiving pamphlets from said dual pick and place assemblies, each pamphlet grasping assembly being positioned transversely to said opposing slotted members and having cam followers disposed within said racetrack-like slots;
   e. dual transport belts positioned between said opposing slotted members;
   f. a plurality of cam operated engagement bars carried by said dual transport belts and movable into and out of engagement with said pamphlet grasping assemblies, said cam operated engagement bars being disengaged from said pamphlet grasping assemblies along the lengths of said upper and lower straight slot sections of said opposing slotted members and moving into engagement with said pamphlet grasping assemblies along said radiused end slot sections of said opposing slotted members for propelling said pamphlet grasping assemblies around said radiused end slot sections; and, g. dual upper and dual lower cylindrical drive cams engageable with said pamphlet grasping assemblies for propelling said pamphlet grasping assemblies along said upper and lower straight slot sections of said opposing slotted members.

10. The labeling system in accordance with claim 9, and further including, a. a laminate web supply roll containing a supply of laminate web having an adhesive facing for receiving and affixing pamphlets delivered to the laminate web by said pamphlet grasping assemblies;

b. a roller positioned beneath said lower straight slot sections of said opposing slotted members, said laminate web extending from said supply roll and being entrained around said roller with said adhesive facing of said laminate web directed upwardly for receipt of pamphlets delivered by said pamphlet grasping assemblies;

c. a backing web supply roll containing a backing web for mating with said adhesive facing of said laminate web and for captivating pamphlets affixed to said adhesive facing of said laminate web;

d. a takeup roll for storing said laminate web and backing web with pamphlets captivated therebetween; and, e. a nip roller set located downstream from both said roller and said backing web supply roll and upstream from said takeup roll for compressing said laminate web against said backing web with pamphlets captivated therebetween.

* * * * *